(12) United States Patent
Schechter (10) Patent No.: US 8,151,553 B1
(45) Date of Patent: Apr. 10, 2012

(54) OPERATING INTERNAL-COMBUSTION ENGINE WITHOUT DISCHARGING GAS INTO ENVIRONMENT

(76) Inventor: Michael Moses Schechter, Farmington Hills, MI (US)

(*) Notice: Subject to any disclaimer, the term of this patent is extended or adjusted under 35 U.S.C. 154(b) by 133 days.

(21) Appl. No.: 12/804,590

(22) Filed: Jul. 26, 2010

(51) Int. Cl.
*F02M 25/06* (2006.01)

(52) U.S. Cl. ............... 60/279; 60/274; 60/278; 60/281; 60/286; 60/289; 60/309; 60/39.26; 60/39.27; 123/567; 123/568.11; 123/568.15; 123/585

(58) Field of Classification Search ............ 60/274, 60/278, 279, 281, 286, 289, 293, 298, 303, 60/309, 320, 39.26, 39.27; 123/1 A, 567, 123/568.11, 568.12, 568.15
See application file for complete search history.

(56) References Cited

U.S. PATENT DOCUMENTS

| | | | |
|---|---|---|---|
| 3,696,975 A * | 10/1972 | Bryant et al. | 222/333 |
| 6,202,574 B1 | 3/2001 | Liljedahl et al. | |
| 7,222,614 B2 * | 5/2007 | Bryant | 123/559.1 |
| 7,469,662 B2 * | 12/2008 | Thomas | 123/43 A |
| 7,654,320 B2 * | 2/2010 | Payton | 166/257 |
| 7,954,478 B1 * | 6/2011 | Schechter | 123/567 |
| 7,958,872 B1 * | 6/2011 | Schechter | 123/568.11 |
| 8,046,984 B1 * | 11/2011 | Schechter | 60/39.27 |

* cited by examiner

*Primary Examiner* — Binh Q Tran (57) ABSTRACT

An internal-combustion engine receives no air from outside atmosphere and it discharges no gas into outside atmosphere. The engine receives fuel, oxygen and recycled combustion gas and its exhaust consists mostly of carbon dioxide and water vapor. Most of the gas exhausted from the engine is recycled back into the engine intake, and the remaining gas is cooled and condensed into liquid carbon dioxide and water. Discharge of greenhouse gas into environment and emission of other harmful air pollutants are eliminated.

20 Claims, 3 Drawing Sheets

OPERATING INTERNAL-COMBUSTION ENGINE WITHOUT DISCHARGING GAS INTO ENVIRONMENT

CROSS-REFERENCE TO RELATED APPLICATIONS

Not Applicable

FEDERALLY SPONSORED RESEARCH

Not Applicable

SEQUENCE LISTING OR PROGRAM

Not Applicable

FIELD OF THE INVENTION

The present invention relates to internal-combustion engines that don't induct air from outside atmosphere and discharge no gas into the atmosphere.

BACKGROUND OF THE INVENTION

Combustion of hydrocarbon fuels in internal-combustion engines is a major contributor to an increase in carbon dioxide content in Earth atmosphere, which according to prevailing scientific consensus contributes to global warming. Another deficiency of the internal combustion engines is in that they are prodigious producers of nitrogen oxides, unburned hydrocarbons and other air pollutants that are very harmful to human health. Efforts to control emission of those pollutants are very complex and expensive, and the results of those efforts to date are insufficient to assure clean air environment, especially in large cities.

In view of the above, it is clear that it is highly desirable to have a system and a method of internal-combustion engine operation that involves no discharge of greenhouse gas into outside atmosphere and prevents emission of other harmful air pollutants. Such a system and a method are the subject of the present invention.

PRIOR ART

A U.S. Pat. No. 6,202,574 to Liljedahl et al describes a power-generating system that includes a furnace, in which pulverized coal is burned in an atmosphere of oxygen and recycled flue gas. This heats and boils water that flows in a closed circuit through a system of pipes and provides steam for steam-turbine operation. The heat of the flue gas exiting the furnace is used to heat up the oxygen and the recycled flue gas flowing into the furnace. It also adds heat to the water in the pipes. After that, the flue gas is separated into a recycling portion that flows back into the furnace and the end portion that is cooled and compressed to condense water vapor and carbon-dioxide gas contained in that portion. The recycled portion of the flue gas is also used for pulverizing the coal used for combustion.

Burning fuel in an atmosphere that consists mostly of recycled exhaust gas and oxygen in a combustion chamber of a reciprocating-piston-type internal-combustion engine is very different from performing the same in a furnace serving an external-combustion power-generation plant such as a steam turbine. In the furnace, a continuous-combustion process takes place. Once the fire is initiated, it continues to burn uninterrupted, with approximately constant pressure and temperature, for as long as fuel and oxygen are fed into the furnace. In contrast to that, the combustion process taking place in the cylinder of a piston-type internal-combustion engine is a series of short-duration high-intensity internal-combustion cycles repeatedly performed with very high frequency in a limited-volume chamber. During each cycle, combustion must be initiated, performed and extinguished, and the time available for that is very short and variable. To assure reliable ignition and proper speed of flame propagation in each cycle under variable operational conditions, a tight control of the intake-gas composition and its pressure and temperature is required. The method of the present invention provides a means to achieve that.

The gas-flow splitter described in the present invention includes a means for a variable control of the gas-flow distribution between the recycled gas and the excess gas. Varying the restriction to the flow of the excess gas varies the pressure and the mass of the recycled gas. It also has the added advantage of being able to supercharge the engine without using a turbocharger or a supercharger.

In contrast to the conditions in the furnace described by Liljedahl et al, where heating of oxygen and of the recycled gas is required, the system of the present invention requires cooling of the recycled gas. This is because the gas inducted into an internal-combustion engine is subject to compression in the cylinder, which leads to a substantial increase in its temperature. Since the recycled gas is initially very hot, it should be cooled, before its induction into the engine, to prevent excessively high temperature in the engine cylinder. In addition, due to limited cylinder volume, higher inlet gas temperature means the mass of the inducted gas is smaller, which leads to a loss of engine power. The system of the present invention includes a gas cooler for cooling the recycled gas. It also includes a means for controlling the amount of heat taken out of that gas, thus controlling the gas temperature and the amount of water vapor remaining in that gas.

Because of the short time available for combustion in an internal-combustion engine, the combustion must be very fast. To achieve fast and complete combustion, the intake gas of an internal-combustion engine often contains more oxygen than it is theoretically necessary to burn the fuel, and because of that, the exhaust gas contains residual oxygen that remains in gaseous state after completion of the carbon-dioxide condensation. The system of the present invention includes a means for flowing that excess oxygen back into the engine.

Operation of a piston-type internal-combustion engine is a fast-paced process. In some cases, there may not be enough time for complete carbon-dioxide condensation, and some accumulation of carbon-dioxide gas may take place in the carbon-dioxide-condensation system. The system of the present invention provides a means for flowing the residual carbon-dioxide gas back into the engine.

The system of the present invention offers a method for accelerating and improving the process of carbon-dioxide condensation by using liquid oxygen in that process. Liquid oxygen absorbs the latent heat of carbon-dioxide condensation and evaporates, while the heat released by carbon-dioxide gas feeds the latent heat of liquid-oxygen evaporation and is condensed into liquid carbon dioxide.

The system of the present invention also offers a method for heating and boiling water condensed out of the recycled gas and for injecting water and steam into the engine during its operation. Injecting water into the engine cylinder during gas compression improves efficiency by reducing the compression work performed by the piston. Injecting steam into the engine cylinder during gas expansion improves efficiency by increasing the expansion work performed on the piston.

OBJECTS AND ADVANTAGES

One object of the present invention is to completely eliminate any harmful effects an internal combustion engine may have on the environment and on Earth climate. This is achieved by eliminating any gas exchange between the engine of the present invention and outside atmosphere. The engine receives no air from outside atmosphere and discharges no gas into outside atmosphere. Therefore, in contrast to conventional internal combustion engines that discharge exhaust gas into the atmosphere, the engine of the present invention discharges no harmful air pollutants into the outside air, thus contributing to cleaner and healthier air environment. Since no greenhouse gas (carbon dioxide) is released into the atmosphere, operation of the engine of the present invention has no adverse effect on the Earth climate.

Another object of the present invention is to achieve a substantial reduction in the required size of internal-combustion engine. The engine of the present invention can be considerably smaller than a conventional air-breathing engine with the same power capacity. That is because carbon dioxide, which is the main ingredient in the recycled combustion gas of the above described engine, is much heavier than nitrogen, which is the main ingredient in the intake air of a conventional engine. Therefore, a smaller engine cylinder can receive the same mass of gas as a larger cylinder in a conventional engine using air at the same pressure and temperature. Direct injection of steam and water into the engine cylinders, after the intake valve closure, contributes to further reduction in engine size, since the cylinder becomes completely filled with recycled gas before steam and water are added. This increases the total mass of gas participating in combustion and permits a reduction in the size of the cylinder. Because of that, the engine of the present invention can be much smaller than a conventional engine of comparable power. A smaller engine has less friction and a much better fuel economy.

A further object of the present invention is to achieve a substantial reduction in fuel consumption by operating the engine at lower average cycle temperature. The engine of the present invention runs much cooler than a conventional air-breathing engine. That is because carbon dioxide has a much higher heat absorbing capacity than nitrogen. Direct injection of water, during gas compression, further contributes to cool operation. Because of that, the engine can operate with higher gas compression. Both cooler operation and higher compression ratio contribute to better fuel efficiency.

A still another object of the present invention is to improve combustion efficiency in internal-combustion engine. The engine of the present invention has very good combustion efficiency. Since most of the combustion gas is recycled back into the engine cylinders over-and-over again, an average particle of gas goes through the combustion process many times before it is discharged into the gas-condensation system. In such operation, most of the unburned hydrocarbons and particulate matter are repeatedly returned to the combustion chamber and are burned there. Better combustion efficiency contributes to better fuel efficiency.

Yet another object of the present invention is to eliminate the need for a turbocharger or a supercharger for boosted engine operation. The engine of the present invention does not require a turbocharger or a supercharger for boosted operation. It is inherently self-supercharging. Increasing restriction to flow of excess combustion gas increases the pressure of combustion gas recycled back into the engine. Elimination of a turbocharger or a supercharger is a substantial reduction in cost.

SUMMARY

The engine system of the present invention receives no air from outside atmosphere and discharges no gas into outside atmosphere. Most of the combustion gas expelled from the engine is cooled and recycled back into the engine. That gas contains no nitrogen and consists mostly of carbon dioxide and water vapor. When oxygen is added to such gas, it forms a kind of "artificial air" that can be used for combustion in the engine. Oxygen and fuel are added to the recycled gas, and the resulting mixture is used to perform an internal-combustion cycle. A small amount of the expelled combustion gas is not recycled. Instead, that gas, the excess gas, is routed into a gas-condensation system, where its contents are separately condensed into water and liquid carbon dioxide and collected in separate storage vessels for future removal. Since no gas is discharged into outside atmosphere, operation of the system has no adverse effect on the environment.

In some variants of the system, heat of the recycled gas is used to produce steam that is injected into the engine cylinders, at a later time, to produce more power.

The engine of the present invention can be considerably smaller than a conventional air-breathing engine with the same power capacity. That is because carbon dioxide, which is the main ingredient in the recycled combustion gas of the above described engine, is much heavier than nitrogen, which is the main ingredient in the intake air of a conventional engine. Therefore, a smaller engine cylinder can receive the same mass of gas as a larger cylinder in a conventional engine using air at the same pressure and temperature. Because of that, the engine of the present invention can be much smaller than a conventional engine of comparable power. A smaller engine has less friction and a much better fuel economy.

The engine of the present invention runs much cooler than a conventional air-breathing engine. That is because carbon dioxide has a much higher heat absorbing capacity than nitrogen. Because of that, the engine can operate with higher gas compression. Both cooler operation and higher compression ratio contribute to better fuel efficiency.

The engine of the present invention has very good combustion efficiency. Since most of the combustion gas is recycled back into the engine cylinders over-and-over again, an average particle of gas goes through the combustion process many times before it is discharged into the gas-condensation system. In such operation, most of the unburned hydrocarbons and particulate matter are repeatedly returned to the combustion chamber and are burned there. This contributes to better fuel efficiency.

The engine of the present invention does not require a turbocharger or a supercharger for boosted operation. It is inherently self-supercharging. Increasing restriction to flow of excess combustion gas increases the pressure of combustion gas recycled back into the engine. The net result is a greater mass of the recycled gas flowing into the engine cylinders. There is no shortage of gas, since the mass of gas exiting the engine cylinders is always greater than the mass of the combustion gas recycled back into the engine. Elimination of a turbocharger or a supercharger is a substantial reduction in cost.

DESCRIPTION OF THE PREFERRED EMBODIMENT

The method of the present invention can be applied both to four-stroke and to two-stroke engines. Both spark-ignition and compression ignition engines can be used.

Figure 1:
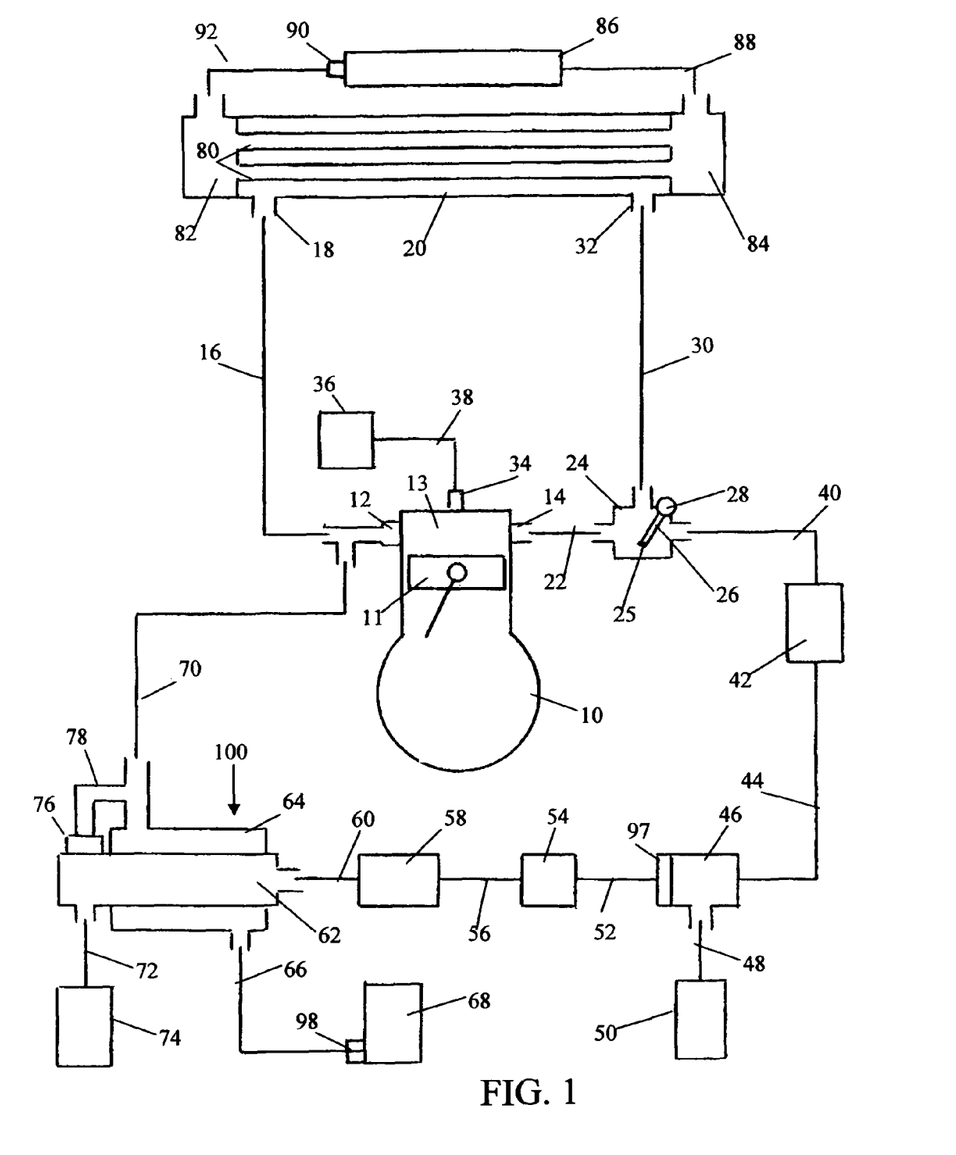
FIG. 1 is a schematic diagram illustrating a piston-type internal-combustion engine and its connections to sources of fuel, oxygen and recycled gas and to a system that retains and stores water and carbon dioxide produced during engine operation.

FIG. 1 is a schematic diagram illustrating a piston-type internal-combustion engine and its connections to sources of fuel, oxygen and recycled gas and to a system that retains and stores water and carbon dioxide produced during engine operation.

An engine 10 is shown in a simplified lateral crossection. It has at least one cylinder with a piston 11 reciprocating underneath a variable-volume cylinder chamber 13. Engine 10 has a gas inlet system 12 and a gas outlet system 14. Depending on the type of the engine, inlet and outlet of gas into and out of engine 10 can be implemented either by using intake and exhaust valves (not shown), in case of a four-stroke engine, or by using intake and exhaust ports (not shown), in case of a two-stroke engine. Gas inlet system 12 is connected, via a pipe 16, to an outlet 18 from a gas cooler 20. Gas outlet system 14 is connected, via a pipe 22 to a gas-flow splitter 24 that contains a plate-valve 26 rotatably mounted upon a pivot 28. The angular position of plate-valve 26 can be controlled by an actuator (not shown) installed on pivot 28. Gas-flow splitter 24 is connected, via a pipe 30 to an inlet 32 to gas cooler 20. A fuel injector 34 is mounted on engine 10, and it is connected to a fuel supply system 36 via a fuel line 38. Fuel injector 34 includes an actuator (not shown) that can control the amount of fuel injected into cylinder chamber 13.

Inside gas cooler 20, a multitude of cooling pipes 80 connects an inlet chamber 82 to an outlet chamber 84. A heat-rejection system 86 receives cooling fluid from outlet chamber 84, via a pipe 88 and, after heat rejection, pumps it into inlet chamber 82 via a coolant control valve 90 and a pipe 92. Coolant control valve 90 includes a controllable restriction that controls the flow of fluid from heat-rejection system 86 into inlet chamber 82.

Gas-flow splitter 24 is connected, via a pipe 40, to a catalytic converter 42. Variable position of plate valve 26 determines the area of passage 25 that restricts the flow into pipe 40. Catalytic converter 42 is connected, via a pipe 44, to a water-vapor condenser 46, which is essentially a heat exchanger. A pipe 48 connects water-vapor condenser 46 to a water collector 50. Water-vapor condenser 46 is also connected, via a water absorber 97 and a pipe 52, to a compressor 54. Water absorber 97 contains substances that can absorb or filter out water and water vapor contained in a flow of gas and it can be replaced periodically. Compressor 54 is connected, via a pipe 56, to a gas cooler 58. The design and methods of operation of both water-vapor condenser 46 and gas cooler 58 may be similar to those employed in gas cooler 20.

A pipe 60 connects gas cooler 58 to a carbon-dioxide condenser 100, which includes an inner chamber 62 surrounded by an annular outer chamber 64. A liquid-oxygen reservoir 68 is connected to outer chamber 64 via an oxygen-control valve 98 and a pipe 66. Outer chamber 64 is also connected, via a pipe 70, to pipe 16 leading to gas inlet system 12. Inner chamber 62 is connected, via a pipe 60, to gas cooler 58 and, via a pipe 72, to a liquid-carbon-dioxide container 74. Inner chamber 62 is also connected to pipe 70 via a one-way valve 76 and a pipe 78.

The system is equipped with a set of sensors (not shown) that monitors various operational parameters, such as pressure, temperature, engine speed and load, etc. and sends signals carrying information on physical and operational conditions in various parts and components to a control system that controls the operation.

Figure 2:
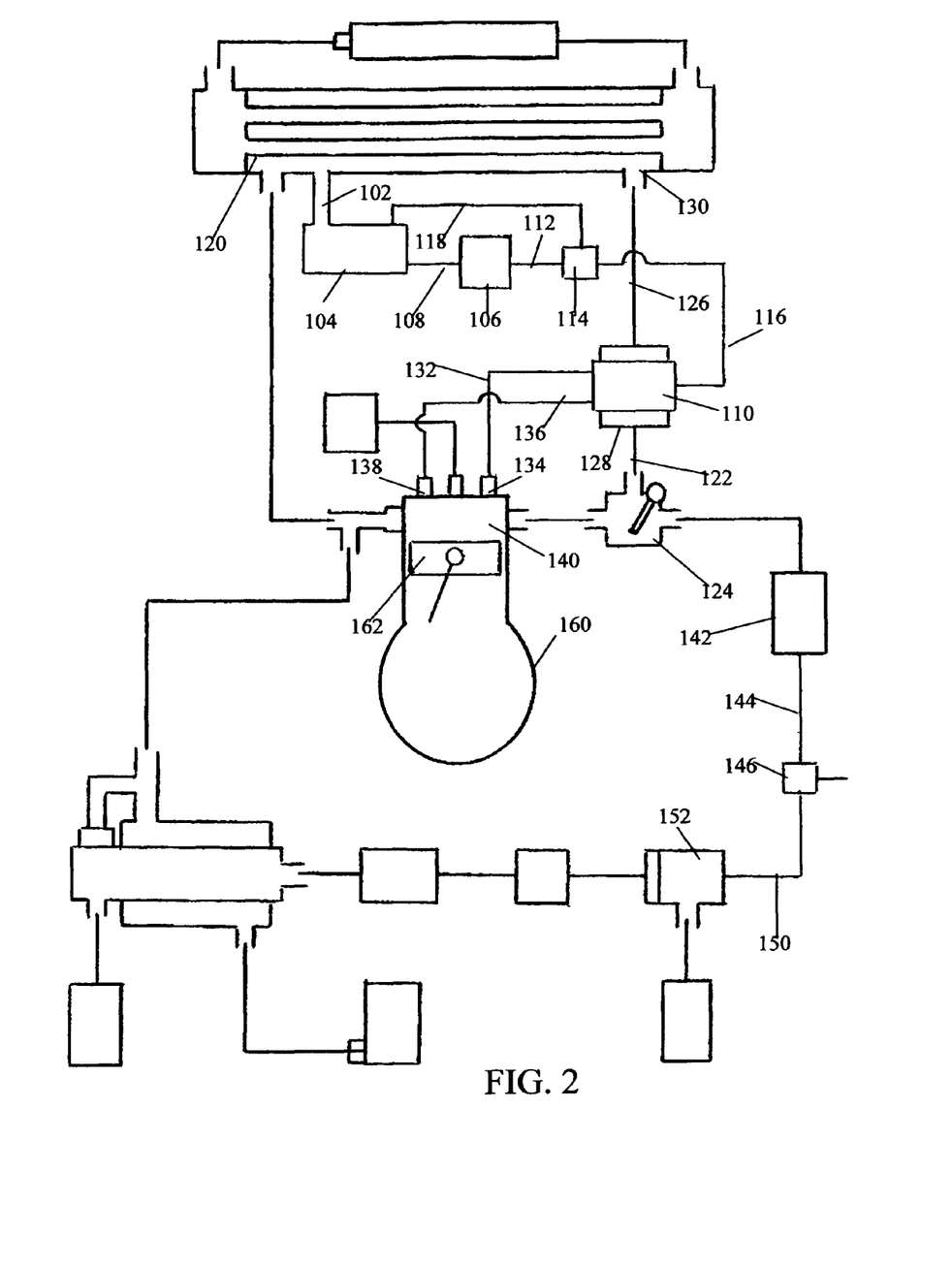
FIG. 2 is a schematic illustration of another variant of the basic design, which includes steam and water injection into the engine.

While FIG. 1 illustrates the basic design of the preferred embodiment, some other variants of the basic design are possible. FIG. 2 is a schematic illustration of another variant of the basic design, which includes steam and water injection into the engine.

In FIG. 2, a condensate pipe 102 connects interior of a gas cooler 120 to a water collector 104. A water pump 106 is connected to water collector 104 via a low-pressure water line 108 and to a water heater 110 via a high-pressure water line 112, an overflow valve 114 and a high-pressure water line 116. A return line 118 connects overflow valve 114 to water collector 104. Water heater 110 is equipped with a heating jacket 128, which is connected, via a pipe 122, to a gas-flow splitter 124 and, via a pipe 126, to an inlet 130 into gas cooler 120.

Water heater 110 is connected, via a pipe 136, to a water injector 138 that is mounted on an engine 160. Water heater 110 is also connected, via a pipe 132, to a steam injector 134 that too is mounted on engine 160. Steam injector 134 and water injector 138 include actuators (not shown) that can control the amount of steam and water, respectively, injected into a cylinder chamber 140. A catalytic converter 142 is connected, via a pipe 144, to a relief valve 146. Relief valve 146 is connected, via a pipe 150, to a water vapor condenser 152. In all other respects, the system of FIG. 2 is identical to the system of FIG. 1.

Figure 3:
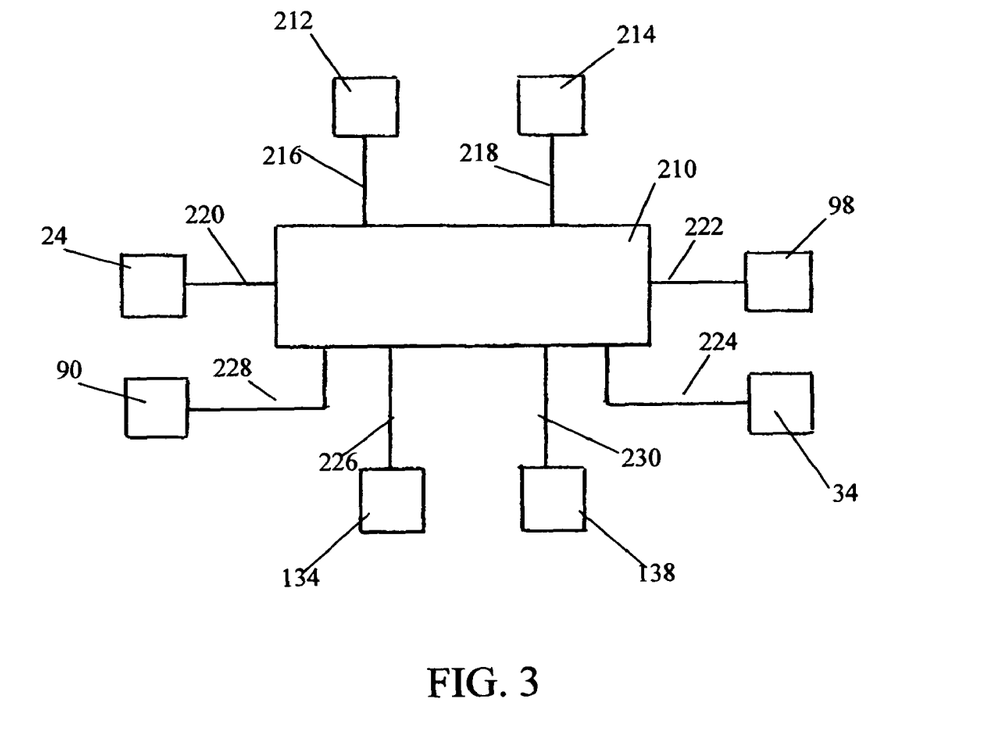
FIG. 3 is a schematic diagram illustrating a system of sensors sending input signals to the engine control system, which sends out output signals to actuators controlling operation of various components of the system.

FIG. 3 is a schematic diagram illustrating a system of sensors sending input signals to the engine control system, which sends out output signals to actuators controlling operation of various components of the system. It is described as applied to the systems shown both in FIGS. 1 and 2. The signals generated by the sensors inform the control system about the engine operator's demands for specific engine power and speed, as the case may be. The input signals also carry information on physical and operational conditions in various parts and components of the system. The control system evaluates the received information and, in accordance with its internal logic, controls operation of the system and its components, so as to satisfy the operator's demands while maintaining optimum fuel consumption efficiency.

A control system 210 (FIG. 3) is an on-board computer programmed to control operation of various components of the engine and the entire system in accordance with a strategy program incorporated into its software. The software contains algorithms and data that permit the control system to evaluate the stream of input signals and determine the magnitude and the timing of each output signal. The output signals control operation of the engine and of the rest of the system and are updated at least once every engine cycle.

Control system 210 (FIG. 3) is connected to a control implement 212 via an electric wire 216. Control implement 212 is a device that permits the engine operator to manually control the engine operation by sending an appropriate control signal to the engine control system specifying the operator's demand for a specific engine power and speed. A cable 218 includes a bundle of individual electric wires carrying individual signals from a set of sensors 214 to control system 210. The sensors may be individually located in different locations in the overall system, and each electric wire is connected to a different sensor.

Output signals go out of control system 210 (FIG. 3) to gas-flow splitter 24 (FIG. 1) via an electric wire 220 (FIG. 3), to oxygen control valve 98 (FIG. 1) via an electric wire 222 (FIG. 3), to fuel injector 34 (FIG. 1) via an electric wire 224 (FIG. 3), to coolant control valve 90 (FIG. 1) via an electric wire 228 (FIG. 3), to steam injector 134 (FIG. 2), via an electric wire 226 (FIG. 3) and to water injector 138 (FIG. 2), via an electric wire 230 (FIG. 3).

Description of Operation

The engine system of the present invention receives no air from outside atmosphere and discharges no gas into outside atmosphere. Most of the combustion gas expelled from the engine is cooled and recycled back into the engine. That gas contains no nitrogen and consists mostly of carbon dioxide and water vapor. When oxygen is added to such gas, it forms a kind of "artificial air" that can be used for combustion in the engine. Oxygen and fuel are added to the recycled gas, and the resulting mixture is used to perform an internal-combustion cycle. A small amount of the expelled combustion gas is not recycled. Instead, that gas is routed into a gas-condensation system, where its contents are separately condensed into water and liquid carbon dioxide and collected in separate storage vessels for a removal at a later time. A more detailed description of the system operation is given below, with references to FIGS. 1, 2 and 3.

Engine 10 (FIG. 1) operates in a gas-recycling mode that requires no air induction into the engine. The combustion gas expelled from each engine cylinder, at the end of each cycle, flows through pipe 22 into gas-flow splitter 24, where plate valve 26 divides the flow into two parts: a flow of recycled gas that flows from gas-flow splitter 24 into gas cooler 20 via pipe 30 and inlet 32, and a flow of excess gas that flows from gas-flow splitter 24 into catalytic converter 42 via pipe 40.

Inside gas cooler 20, hot recycled gas comes into contact with a multitude of cooling pipes 80 and looses a substantial portion of its heat to cooling fluid flowing inside cooling pipes 80. Heat-rejection system 86 pumps cooling fluid through gas cooler 20. The cooling fluid absorbs heat from recycled gas in gas cooler 20 and rejects that heat to outside environment in heat-rejection system 86. Cooling fluid flows from heat-rejection system 86 through coolant control valve 90, pipe 92, inlet chamber 82 and multitude of cooling pipes 80 into outlet chamber 84. From there, it returns to heat-rejection system 86 via pipe 88. Operation of heat-rejection system 86 can be similar to operation of a conventional engine cooling system, which usually includes an air blower blowing atmospheric air through a radiator that carries the cooling fluid. In most cases, heat-rejection system 86 may be integrated with the rest of the engine cooling system.

The cooled recycled gas is inducted into cylinder chamber 13 during each piston 11 intake stroke. The gas flows out of gas cooler 20 through outlet 18 and flows through pipe 16 and gas inlet system 12 into cylinder chamber 13. Oxygen, which is stored in oxygen reservoir 68, is added to the gas that flows through pipe 16. Oxygen flows out of oxygen reservoir 68 through oxygen control valve 98 and flows through pipe 66, outer chamber 64 and pipe 70 into pipe 16. Fuel injector 34 injects fuel into cylinder chamber 13. Fuel flows from fuel supply system 36 through fuel line 38 into fuel injector 34. As a result, a combustible mixture of recycled gas, oxygen and fuel forms in cylinder chamber 13 and it is used to perform an internal-combustion cycle in engine 10.

The excess gas flows from gas-flow splitter 24, via pipe 40, into catalytic converter 42, where products of incomplete combustion, such as unburned hydrocarbons and carbon monoxide, are oxidized into carbon dioxide and water vapor. From catalytic converter 42, the excess gas flows, via pipe 44, into water-vapor condenser 46, where it is cooled to below the water-vapor condensation point. Water vapor contained in the excess gas is condensed, and water flows out of the water vapor condenser 46 through pipe 48 and is collected and stored in water collector 50. Water absorber 97 that is installed at the outlet from water condenser 46 absorbs any residual water droplets and water vapor that may be still carried by the gas.

With water vapor taken out, the remaining excess gas flows into a part of the system that performs carbon-dioxide-gas condensation. Condensation of carbon-dioxide gas into liquid carbon dioxide is a process that is well known and broadly used in the industry. In most cases, it includes successive compression and cooling of the carbon-dioxide gas until a proper combination of elevated gas pressure and reduced gas temperature is achieved. After the water vapor is condensed, the remaining excess gas flows from water-vapor condenser 46, via water absorber 97 and pipe 52, into compressor 54, where it is compressed. From compressor 54, it flows, via pipe 56, into gas cooler 58. Practically, at least two stages of compression, each followed by a cooling stage, are needed to bring the gas to a condition, at which liquid carbon dioxide can exist. Cooled and still compressed gas flows from gas cooler 58, via pipe 60, into inner chamber 62 of carbon-dioxide condenser 100, where the final stage of the gas condensation takes place.

Carbon-dioxide condenser 100 is a heat exchanger, in which carbon-dioxide gas is cooled and condensed by liquid oxygen. Liquid oxygen stored under pressure in oxygen reservoir 68 flows, via oxygen-control valve 98 and pipe 66, into outer chamber 64, where it cools the outer surface of inner chamber 62. Since the temperature of liquid oxygen is much lower than the condensation point of carbon dioxide, the heat exchange between carbon-dioxide gas and liquid oxygen is very vigorous. As a result, carbon-dioxide gas condensation takes place in inner chamber 62, and liquid carbon dioxide flows from inner chamber 62, via pipe 72, into liquid-carbon-dioxide container 74, where it is stored. Liquid oxygen, in outer chamber 64, absorbs the latent heat of carbon-dioxide gas condensation and evaporates, while the carbon dioxide, in inner chamber 62, feeds the latent heat of liquid oxygen evaporation and undergoes condensation. In some cases, it may be desirable to cool carbon dioxide until it turns into a solid. This reduces the volume of storage required. Oxygen gas exits outer chamber 64 and flows through pipe 70 into pipe 16, where it is mixed with the recycled gas.

In some cases, it may be desirable for the combustible mixture, in cylinder chamber 13, to contain more oxygen than what is theoretically needed to burn the fuel. This is because excess oxygen often facilitates a faster and better combustion process. In such a case, both the recycled gas and the excess gas contain some oxygen, and residual oxygen gas accumulates in inner chamber 62. That gas exits inner chamber 62, through one-way valve 76, and flows, via pipe 78, into pipe 70, where it joins the main oxygen flow.

The gas leaving inner chamber 62 through one-way valve 76 may also include some residual amount of carbon-dioxide gas that did not condensate in inner chamber 62. That residual carbon-dioxide gas flows, via one-way valve 76 and pipes 78 and 70 into pipe 16, where it is added to the recycled gas flowing into engine 10.

Operation of the system also includes periodic removal of the accumulated water and liquid (or solid) carbon dioxide.

The gas-flow distribution between the recycled-gas flow from gas-flow splitter 24 into pipe 30 and the excess-gas flow into pipe 40 is controlled by the position of plate valve 26. That position determines the area of passage 25 available for the flow into pipe 40. The flow of gas into pipe 40 must be such that it compensates for the mass of oxygen and fuel that is added to the recycled gas. The flow across passage 25 is determined by, among other factors, the area of passage 25 and the pressure differential across that passage. Reducing that area decreases the flow into pipe 40 and increases the flow into pipe 30. This changes the distribution between the two flows. As a result, the pressure in pipes 22 and 30 increases and an increase in the pressure differential across passage 25 restores the flow of excess gas. The proper flow distribution is restored, but at a higher level of the recycled gas pressure. Conversely, opening up the area of passage 25 leads to a reduction in the recycled gas pressure.

Because of that, the engine of the present invention does not require a turbocharger or a supercharger for boosted operation. It is inherently self-supercharging. Increasing restriction to flow of excess combustion gas out of gas flow splitter 24 (FIG. 1) increases pressure of combustion gas recycled back into gas inlet 12 (FIG. 1). There is less pressure blowdown at the end of the expansion stroke and more cooling is required in gas cooler 20 (FIG. 1), but the net result is a greater mass of gas flowing into cylinder chamber 13 (FIG. 1). There is no shortage of gas, since the mass of gas exiting cylinder chamber 13 is always greater than the mass of gas recycled back into the engine. The quantity of injected fuel and oxygen can be adjusted independently of recycled gas control. Elimination of a turbocharger or a supercharger is a substantial reduction in costs.

FIG. 2 illustrates another variant of the basic design. It differs from the variant shown in FIG. 1 in that it includes injection of water and steam into the engine. In the system of FIG. 2, at least some of the water vapor contained in the recycled gas is condensed into liquid water during its cooling in gas cooler 120. That water flows into water collector 104 via condensate pipe 102. Water pump 106 receives water from water collector 104 through low-pressure water line 108 and pumps it, under pressure, into water heater 110. Pressurized water flows from water pump 106 through high-pressure water line 112, overflow valve 114 and high-pressure water line 116 into water heater 110. Excess water returns from overflow valve 114, through return line 118, back into water collector 104. Hot recycled gas flows from gas-flow splitter 124 through pipe 122 into heating jacket 128, passes through heating jacket 128 and continues through pipe 126 and inlet 130 into gas cooler 120. Hot gas passing through heating jacket 128 heats and boils the water in water heater 110. Superheated steam accumulates in the upper part of water heater 110, while superheated water remains in its lower part. The superheated water flows from the lower part of water heater 110 through pipe 136 to water injector 138 and is injected into cylinder chamber 140 during piston 162 compression stroke. The superheated steam flows from the upper part of water heater 110 through pipe 132 to steam injector 134 and is injected into cylinder chamber 140 during piston 162 expansion stroke.

Water injected into cylinder chamber 140 evaporates. Water evaporation absorbs the heat produced in compression and restricts the pressure and temperature rise. As long as there is liquid water in cylinder chamber 140, the temperature of gas in that chamber is determined by the temperature of the boiling point of water. Thus the compression of gas takes place at near-constant temperature. This reduces the work of compression and leads to lower fuel consumption. Expansion of steam injected into cylinder chamber 140 performs additional work that complements the work performed by expanding combustion gas. This too lowers the engine fuel consumption.

Relief valve 146 is intended to restrict the pressure of the excess gas. It is a one-way valve set to open into outside atmosphere at a pre-determined pressure. Usually, that pressure is set at above atmospheric pressure. If for any reason, the excess-gas pressure exceeds the pre-determined limit, the relief valve opens and brings the gas pressure under control. Most of the time, however, there is no need for the relief valve action, and there is no gas discharge into outside atmosphere during normal engine operation.

In all other respects, the operation of the system of FIG. 2 is identical to that of the system of FIG. 1.

Control of the system operation is illustrated in FIG. 3. It is described as applied to the systems shown both in FIGS. 1 and 2. Control system 210 receives a control signal, via electric wire 216, from control implement 212, which specifies the engine operator's demand for a specific engine power and speed. The control system evaluates the received information and, in accordance with its internal logic, controls operation of the engine and its components, so as to satisfy the operator's demands while maintaining optimum fuel consumption efficiency. Control system 210 also receives input signals, via cable 218, from set of sensors 214 that carry information on physical and operational conditions in various parts and components of the system.

In the system of FIG. 1, control system 210 (FIG. 3) controls operation of engine 10 (FIG. 1) by varying the amount of oxygen added to the recycled gas and the quantity of fuel injected into cylinder chamber 13 (FIG. 1) during each cycle. It also controls the flow and the pressure and temperature of the recycled combustion gas flowing back into the engine. The injected fuel quantity is controlled by sending a control signal to fuel injector 34 (FIG. 1) via electric wire 224. That signal controls the duration of the fuel injector 34 (FIG. 1) opening, and the timing of that signal determines the timing of the injection. The oxygen quantity is controlled by sending a control signal to oxygen control valve 98 (FIG. 1) via electric wire 222 (FIG. 3). The temperature of gas flowing out of gas cooler 20 (FIG. 1) and the quantity of water removed from that gas is controlled by a signal sent to coolant control valve 90 (FIG. 1), via electric wire 228 (FIG. 3), and varies the amount of heat absorbed from the gas by the cooling fluid by varying the flow of that cooling fluid. The pressure of gas flowing into intake gas inlet 12 (FIG. 1) is controlled by a signal sent to gas-flow splitter 24 (FIG. 1) via electric wire 220 (FIG. 3). That varies the angular position of plate valve 26 (FIG. 1) and controls the flow of excess combustion gas discharged into pipe 40 (FIG. 1). This controls the pressure in inlet 32 (FIG. 1), and since inlet 32 is directly connected to gas inlet 12 (FIG. 1) via gas cooler 20 and pipe 16, it indirectly controls the pressure of the gas flowing into engine 10.

In the system of FIG. 2, control of fuel and oxygen flow and control of the recycled gas pressure and temperature is performed in the same manner as in the system of FIG. 1, but in addition, control system 210 (FIG. 3) also controls water and steam injection. The injected water quantity is controlled by sending a control signal to water injector 138 (FIG. 2) via electric wire 230 (FIG. 3). That signal controls the duration of the injector opening, and the timing of the signal determines the timing of the injection. The injected steam quantity is controlled by sending a control signal to steam injector 134 (FIG. 2) via electric wire 226 (FIG. 3). That signal controls the duration of steam injector 134 opening, and the timing of the signal determines the timing of the injection.

CONCLUSION, RAMIFICATIONS AND SCOPE

The engine system of the present invention can have a very positive effect on environment. The engine receives no air from outside atmosphere and discharges no gas into outside atmosphere. Therefore, in contrast to conventional internal combustion engines that discharge exhaust gas into the atmosphere, the engine of the present invention discharges no harmful air pollutants into the outside air, thus contributing to cleaner and healthier air environment. Since no greenhouse gas (carbon dioxide) is released into the atmosphere, operation of the engine of the present invention has no adverse effect on the Earth climate.

The engine of the present invention can be considerably smaller than a conventional air-breathing engine with the same power capacity. That is because carbon dioxide, which is the main ingredient in the recycled combustion gas of the above described engine, is much heavier than nitrogen, which is the main ingredient in the intake air of a conventional engine. Therefore, a smaller engine cylinder can receive the same mass of gas as a larger cylinder in a conventional engine using air at the same pressure and temperature. Direct injection of steam and water into the engine cylinder, after the intake valve closure, contributes to further reduction in engine size, since the cylinder becomes completely filled with recycled gas before steam and water are added. This increases the total mass of gas participating in combustion and permits a reduction in the size of the cylinder. Because of that, the engine of the present invention can be much smaller than a conventional engine of comparable power. A smaller engine has less friction and a much better fuel economy.

The engine of the present invention runs much cooler than a conventional air-breathing engine. That is because carbon dioxide has a much higher heat absorbing capacity than nitrogen. Direct injection of water, during gas compression, further contributes to cool operation. Because of that, the engine can operate with higher gas compression. Both cooler operation and higher compression ratio contribute to better fuel efficiency.

The engine of the present invention has very good combustion efficiency. Since most of the combustion gas is recycled back into the engine cylinders over-and-over again, an average particle of gas goes through the combustion process many times before it is discharged into the gas-condensation system. In such operation, most of the unburned hydrocarbons and particulate matter are repeatedly returned to the combustion chamber and are burned there. Better combustion efficiency contributes to better fuel efficiency.

The engine of the present invention does not require a turbocharger or a supercharger for boosted operation. It is inherently self-supercharging. Increasing restriction to flow of excess combustion gas increases the pressure of combustion gas recycled back into the engine. Elimination of a turbocharger or a supercharger is a substantial reduction in cost.

Although the description above contains much specificity, this should not be construed as limiting the scope of the invention, but as merely providing illustrations of some of the presently preferred embodiments of this invention. For example, it was assumed that the above described engine uses an injectable hydrocarbon fuel. However, the concept of the present invention also applies to engines that use other types of fuels (for example gaseous fuel) that may be added to the recycled gas before it enters the engine. The concept is not limited to reciprocating-piston-type engines. It also applies to rotary-type internal combustion engines. Gaseous oxygen supply can be used instead of liquid oxygen. Oxygen can also be produced on-site or on-board out of atmospheric air by using cryogenic or other methods. Other methods of carbon dioxide separation, such as gas adsorption, can be used instead of the cryogenic method. Oxygen can be injected directly into the engine cylinders. Other types of valves can be used for gas-pressure control instead of plate valve 26 shown in FIG. 1. In some other cases, the pressure control system may also include a controllable throttle valve installed at the inlet to engine 10 (FIG. 1) or at the inlet to gas cooler 20 (FIG. 1). This broadens the range of gas-pressure control. Also other types of cooling fluids can be used for gas cooling.

Thus the scope of the invention should be determined by the appended claims and their legal equivalents, rather than by the examples given.

I claim:

1. A method for operating an internal-combustion engine system, said method comprising the steps of:
   (a) providing an internal-combustion engine that uses recycled combustion gas and oxygen instead of air, said engine including at least one cylinder, a cylinder chamber within said at least one cylinder and a piston that can reciprocate in said at least one cylinder, said engine receiving recycled combustion gas, oxygen and fuel and exhausting hot combustion gas containing carbon dioxide and water vapor,
   (b) providing a gas-flow-splitting means for a controllable splitting of flow of said hot combustion gas into two flows: a flow of recycled combustion gas and a flow of excess combustion gas,
   (c) providing a gas-flow-controlling means for controlling said splitting of said hot combustion gas and for controlling the pressure of said recycled combustion gas,
   (d) providing a gas-exhaust means for connecting said engine to said gas-splitting means and for discharging hot combustion gas from said engine into said gas-splitting means,
   (e) providing a gas-cooling means for receiving, cooling and discharge of said recycled combustion gas,
   (f) providing a gas-intake means for connecting said engine to said gas-cooling means and for receiving cooled recycled combustion gas from said gas-cooling means into said engine,
   (g) providing a source of oxygen and an oxygen-delivery means for adding oxygen to said recycled combustion gas,
   (h) providing a source of fuel and a fuel-delivery means for adding fuel to said recycled combustion gas,
   (i) providing a gas-condensation means for receiving said excess combustion gas and for cooling and condensing water vapor and carbon-dioxide gas contained in said excess combustion gas,
   (j) providing a water-storage means for collecting and storing water condensed in said gas-condensation means,
   (k) providing a carbon-dioxide-storage means for collecting and storing liquid carbon dioxide condensed in said gas-condensation means,
   (l) providing a control means for controlling the operation of said internal-combustion engine system in response to operator's demands and in accordance with a control program incorporated in said control means, (m) operating said engine in a gas-recycling mode by repeatedly performing an engine cycle that includes the steps of:
  (1) cooling said recycled combustion gas in said gas-cooling means, whereby said hot recycled combustion gas turns into cooled recycled combustion gas,
  (2) receiving said cooled recycled combustion gas from said gas-cooling means into said engine,
  (3) adding oxygen and fuel to said cooled recycled combustion gas, whereby a combustible mixture forms,
  (4) using said combustible mixture to perform an internal-combustion cycle in said engine, said internal-combustion cycle including gas compression, combustion and gas expansion, whereby said combustible mixture turns into a hot combustion gas that performs work on said piston,
  (5) discharging said hot combustion gas from said engine into said gas-flow-splitting means,
  (6) splitting the flow of said hot combustion gas into two flows: a flow of recycled combustion gas and a flow of excess combustion gas, and
  (7) receiving said recycled combustion gas from said gas-flow-splitting means into said gas-cooling means,
(n) receiving said excess combustion gas from said gas-flow-splitting means into said gas-condensation means,
(o) condensing water vapor contained in said excess combustion gas and collecting water in said water-storage means,
(p) condensing carbon-dioxide gas contained in said excess combustion gas and collecting liquid carbon dioxide in said carbon-dioxide-storage means,
(q) using said control means for control of operation of said internal-combustion engine system, and
(r) periodically removing water collected in said water-storage means and carbon dioxide collected in said liquid-carbon-dioxide-storage means,
whereby said engine operates without receiving any air from outside atmosphere and without discharging any gas into outside atmosphere, and
whereby no greenhouse gas and no other harmful pollutants are released into outside atmosphere during said engine operation.

2. The method of claim 1 wherein:
  (a) said gas-flow-controlling means includes a controllably-variable restriction to the flow of said excess combustion gas, and
  (b) said control of operation of said internal-combustion engine includes controlling said controllably-variable restriction,
whereby pressure of said recycled combustion gas is controlled,
whereby pressure of said cooled recycled combustion gas is controlled,
whereby the mass of said recycled combustion gas is controlled, and
whereby said engine can be controllably supercharged.

3. The method of claim 1 wherein:
  (a) said gas-cooling means includes a flow of cooling fluid through said gas-cooling means and a means for control of operation of said gas-cooling means by controlling said flow of cooling fluid, and
  (b) said control of operation of said gas-cooling means includes controlling said flow of cooling fluid,
whereby amount of heat taken out from said recycled combustion gas is controlled,
whereby temperature of said recycled combustion gas is controlled, and
whereby amount of water vapor condensed in said gas-cooling means can be controlled.

4. The method of claim 1 further including the steps of
  (a) providing a means for flowing excess oxygen from said gas-condensation means into said oxygen-delivery means, and
  (b) flowing excess oxygen from said gas-condensation means into said oxygen-delivery means.

5. The method of claim 1 further including the steps of:
  (a) providing a means for flowing residual carbon-dioxide gas from said gas-condensation means into said gas-intake means, and
  (b) flowing said residual carbon-dioxide gas from said gas-condensation means into said gas-intake means.

6. The method of claim 1 further including the steps of:
  (a) providing a means for collecting water condensed in said gas-cooling means,
  (b) providing a heat-exchange means for heating and boiling said water condensed in said gas-cooling means, and
  (c) using the heat of said recycled combustion gas for heating and boiling said water condensed in said gas-cooling means in said heat-exchange means,
whereby said recycled combustion gas is cooled and a high-pressure steam is generated in said heat-exchange means.

7. The method of claim 6 further including the steps of:
  (a) providing a means for adding said water condensed in said gas-cooling means to gas in said cylinder chamber, and
  (b) adding a charge of said water condensed in said gas-cooling means to gas in said cylinder chamber during said gas compression,
whereby work of said gas compression is reduced and said engine fuel efficiency is improved.

8. The method of claim 6 further including the steps of:
  (a) providing means for adding said steam to gas in said cylinder chamber, and
  (b) adding a charge of said steam to gas in said cylinder chamber during said gas expansion,
whereby work of said gas expansion is increased and said engine fuel efficiency is improved.

9. The method of claim 1 wherein said source of oxygen is a source of liquid oxygen and wherein the step of condensing carbon-dioxide gas further includes the step of using said liquid oxygen to cool said excess combustion gas in said gas-condensation means, whereby said liquid oxygen evaporates and said carbon-dioxide gas contained in said excess combustion gas is condensed into liquid carbon dioxide.

10. The method of claim 1 further including the step of converting said carbon dioxide into solid carbon dioxide, whereby a smaller volume of said carbon-dioxide-storage means is needed.

11. An internal-combustion-engine system that discharges no gas into outside atmosphere, said system comprising:
  (a) a reciprocating-piston-type internal-combustion engine that uses recycled combustion gas and oxygen instead of air for its operation, said engine receiving fuel, oxygen and recycled combustion gas and exhausting combustion gas containing mostly carbon dioxide and water vapor,
  (b) a gas-flow-splitting means for receiving said combustion gas and for controllable splitting of flow of said combustion gas into two flows: a flow of said recycled gas and a flow of excess gas,
  (c) a gas-cooling means for receiving, cooling and discharge of said recycled combustion gas, (d) a gas-condensation means for receiving said excess combustion gas and for cooling and condensing water vapor and carbon-dioxide gas contained in said excess combustion gas,
(e) a liquid-carbon-dioxide-storage means for collecting and storing liquid carbon dioxide condensed in said gas-condensation means, and
(f) a source of fuel, a source of oxygen and a means for adding fuel and oxygen to said recycled combustion gas.

12. The system of claim 11 wherein said gas-flow-splitting means includes a means for controlling pressure of said recycled combustion gas.

13. The system of claim 12 wherein said means for controlling pressure of said recycled combustion gas includes a controllably-variable restriction to the flow of said excess combustion gas.

14. The system of claim 11 wherein said gas-cooling means further includes a means for controlling the temperature of gas received into said engine.

15. The system of claim 11 further comprising a means for flowing excess oxygen from said gas-condensing means back into said engine.

16. The system of claim 11 further comprising a means for flowing residual carbon-dioxide gas from said gas-condensing means back into said engine.

17. The system of claim 11 further comprising a means for condensing water vapor contained in said recycled combustion gas into liquid water and for collecting said water in a water collector.

18. The system of claim 17 further comprising a means for injecting said water into said engine during said engine operation.

19. The system of claim 17 further comprising a means for using heat of said recycled gas to convert said water into steam and for injecting said steam into said engine during said engine operation.

20. A method for operating a piston-type internal-combustion engine that inducts no air from outside atmosphere and discharges no gas into outside atmosphere, said method including operating said engine in a gas-recycling mode wherein said engine receives fuel, oxygen and recycled combustion gas and it exhausts combustion gas containing mostly water vapor and carbon-dioxide gas, one part of said combustion gas being used as said recycled combustion gas, and another part of said combustion gas being converted into water and liquid carbon dioxide that are separately stored until removal at a later time.

* * * * *